United States Patent
Thornley et al.

(10) Patent No.: US 9,026,260 B1
(45) Date of Patent: May 5, 2015

(54) SECURE MICROGRID

(75) Inventors: Darrell Thornley, Austin, TX (US);
William Cleary, Jr., Littleton, CO (US);
Dorothy S. Small, Christiansburg, VA (US)

(73) Assignee: Shaw Intellectual Property Holdings, Inc., Baton Rouge, LA (US)

( * ) Notice: Subject to any disclaimer, the term of this patent is extended or adjusted under 35 U.S.C. 154(b) by 0 days.

(21) Appl. No.: 13/479,101

(22) Filed: May 23, 2012

Related U.S. Application Data

(60) Provisional application No. 61/489,128, filed on May 23, 2011.

(51) Int. Cl.
*H02J 3/00* (2006.01)

(52) U.S. Cl.
CPC ............. *H02J 3/00* (2013.01); *H02J 2003/007* (2013.01); *H02J 2003/001* (2013.01)

(58) Field of Classification Search
None
See application file for complete search history.

(56) References Cited

U.S. PATENT DOCUMENTS

| | | | | |
|---|---|---|---|---|
| 6,757,590 | B2 * | 6/2004 | Ross et al. | 700/286 |
| 7,155,320 | B2 * | 12/2006 | Gee | 700/295 |
| 7,701,087 | B2 * | 4/2010 | Eckroad et al. | 307/46 |
| 8,121,741 | B2 * | 2/2012 | Taft et al. | 700/295 |
| 2003/0111909 | A1 * | 6/2003 | Liu et al. | 307/64 |
| 2007/0010916 | A1 * | 1/2007 | Rodgers et al. | 700/295 |
| 2008/0258557 | A1 * | 10/2008 | Lathrop et al. | 307/25 |
| 2010/0179704 | A1 * | 7/2010 | Ozog | 700/291 |
| 2010/0211233 | A1 * | 8/2010 | Roscoe et al. | 700/295 |
| 2011/0039237 | A1 * | 2/2011 | Skare | 434/118 |
| 2011/0115295 | A1 * | 5/2011 | Moon et al. | 307/65 |
| 2012/0029711 | A1 * | 2/2012 | Besore et al. | 700/287 |
| 2012/0191440 | A1 * | 7/2012 | Meagher et al. | 703/18 |

OTHER PUBLICATIONS

Kelly et al. "The Illinois Institute of Technology Perfect Power System Prototype" Grid-Interop Forum gridwiseac.org 2007.*
Galvin Electricity Initiative, "Master Controller Requirements Specification for Perfect Power Systems" Galvin Electricity Initiative, Rev. 3 02162007, Feb. 16, 2007.*
Abdallah et al., "Control dynamics of adaptive and scalable power and energy systems for military micro grids" Construction Engineering Research Laboratory, US Army Corps of Engineers, Dec. 2006.*
North American Electric Reliability Corporation, "Real-Time Application of Synchrophasors for Improving Reliability," Oct. 2010. Available: nerc.com/docs/oc/rapirtf/RAPIR%20final%20101710.pdf.*

* cited by examiner

*Primary Examiner* — Ryan Jarrett
(74) *Attorney, Agent, or Firm* — Osha Liang LLP

(57) ABSTRACT

A microgrid comprising a utility interconnect connecting the microgrid to an electric utility power distribution system; an underground power distribution system wherein the underground power distribution system is configured to have a feature selected from redundant power distribution capabilities and being wired as a loop distribution system with sectionalizing switches; a first set of loads comprising all non-resilient mission critical loads in the microgrid; a second set of loads comprising all resilient mission critical loads in the microgrid not contained in the first set of loads; a combined mission critical load comprising the first set of loads and the second set of loads; a first power generation source; and a second power generation source wherein the second power generation source is a renewable energy power generation source is disclosed herein. Also disclosed herein are methods of protecting microgrids by implementing similar features.

20 Claims, 10 Drawing Sheets

| Item | 1 | | 2 | | | |
|---|---|---|---|---|---|---|
| Function | Utility Inter-connect | Single Inter-connect | Customer Sub-station | Sub-station | Substation | OH Radial Distribution System |
| Failure mode | | Breaker Trip | | Breaker Trip | Breaker Trip | Breaker Trip |
| Effects | | Loss of Power | | Loss of Power | Loss of Power | Loss of Power |
| S (severity rating) | | 7 | | 7 | 10 | 7 |
| Cause(s) | | Line Fault | | Line Fault | Trans-former Fault | Line Fault |
| O (occurrence rating) | | 2 | | 2 | 3 | 4 |
| Current controls | | Protect-ive Relay | | Protective Relay | Protective Relay | Protect-ive Relay |
| D (detection rating) | | 1 | | 1 | 1 | 3 |
| RPN (risk priority number) | 0 | 14 | 0 | 14 | 30 | 84 |
| Recommended actions | | | | | | |

Fig. 2

| Item | 3 | | | 4 | | |
|---|---|---|---|---|---|---|
| Function | Communications | Phone System | LAN System | Distributed Generation | Photovoltaic System | Diesel Generator |
| Failure mode | | Switch Failure | Server Failure | | | |
| Effects | | Loss of Communications | Loss of Communications | | | |
| S (severity rating) | | | | | | |
| Cause(s) | | Cyber Attack | Cyber Attack | | | |
| O (occurrence rating) | | | | | | |
| Current controls | | | | | | |
| D (detection rating) | | | | | | |
| RPN (risk priority number) | 0 | 0 | | 0 | 0 | |
| Recommended actions | | | | | | |

Fig. 3

| Item | 5 | | 6 | |
|---|---|---|---|---|
| Function | Energy Storage | 2MW Battery System | UPS & Battery | 25 kW w/2 hr Battery |
| Failure mode | | | | |
| Effects | | | | |
| S (severity rating) | | | | |
| Cause(s) | | | | |
| O (occurrence rating) | | | | |
| Current controls | | | | |
| D (detection rating) | | | | |
| RPN (risk priority number) | 0 | 0 | 0 | 0 |
| Recommended actions | | | | |

Fig. 4

| Item | 7 | 8 | 9 | 10 |
|---|---|---|---|---|
| Function | Nonresilient Mission Critical Electrical Loads | Resilient Mission Critical Electrical Loads | Non-Mission Critical Loads (supported by on-site generation) | Non-Mission Critical Loads (not supported by on-site generation) |
| Failure mode | | | | |
| Effects | | | | |
| S (severity rating) | | | | |
| Cause(s) | | | | |
| O (occurrence rating) | | | | |
| Current controls | | | | |
| D (detection rating) | | | | |
| RPN (risk priority number) | 0 | 0 | 0 | 0 |
| Recommended actions | | | | |

Fig. 5

| Severity Table | |
|---|---|
| Rating | Description |
| 1 | No effect |
| 2 | Very minor |
| 3 | Minor |
| 4,5,6 | Moderate |
| 7,8 | High |
| 9,10 | Very High |

Fig. 6

| Occurrence Table | |
|---|---|
| Rating | Description |
| 1 | No effect |
| 2,3 | Low - relatively few failures |
| 4,5,6 | Moderate - occasional failures |
| 7,8 | High - repeated failures |
| 9,10 | Very High - failure is almost inevitable |

Fig. 7

| Detection Table | |
|---|---|
| Rating | Description |
| 1 | Almost Certain |
| 2 | High |
| 3 | Probable |
| 4,5,6 | Moderate |
| 7,8 | Low |
| 9,10 | Very Remote |

Fig. 8

| Item | Description | Characteristics | Potential Failures | Action |
|---|---|---|---|---|
| 1.0 | Prequisites | | | |
| 1.1 | Define the limits of the HSM | | | |
| 2.0 | Utility Interconnect | | | |
| 2.1 | Identify number of Interconnects | | | |
| 2.2 | Identify Voltage at each Interconnect | | | |
| 2.3 | Identify Utility controlled disconnecting means at each interconnect | | | |
| 2.4 | Identify fault protection at each interconnect | | | |
| 2.5 | Identify existing AMI technology at each interconnect | | | |

Fig. 9

| Item | Description | Character-istics | Potential Failures | Action |
|---|---|---|---|---|
| 3.0 | Customer Substation | | | |
| 3.1 | Identify Customer controlled disconnecting means at each interconnect | | | |
| 3.2 | Identify fault protection associated with each disconnecting means | | | |
| 3.3 | Identify Transformers associated with each interconnect | | | |
| 3.4 | Identify fault protection associated with each transformer | | | |
| 3.5 | Identify Customer secondary disconnecting means at each transformer | | | |
| 3.6 | Identify fault protection associated with each secondary disconnecting means | | | |
| 3.7 | Identify secondary distribution system | | | |
| 4.0 | HSM Communications | | | |
| 4.1 | Identify phone system | | | |
| 4.2 | Identify LAN system | | | |

Fig. 10

| Item | Description | Character-istics | Potential Failures | Action |
|---|---|---|---|---|
| 5.0 | Distributed Generation & Energy Storage | | | |
| 5.1 | Identify existing Distributed Generation | | | |
| 5.2 | Identify energy/fuel and energy/fuel storage capacity | | | |
| 5.3 | Identify potential opportunities for new distributed generation | | | |
| 6.0 | UPS & Battery | | | |
| 6.1 | Identify the UPS & Battery systems supporting the Mission Critical loads. | | | |
| 7.0 | Mission Critical Non-Resilient Electrical Loads | | | |
| 7.1 | Identify all electrical loads that require 100% uptime | | | |
| 7.2 | Identify the disconnecting means at each mission critical load | | | |
| 7.3 | Identify fault protection associated with each disconnecting means for the Mission Critical loads | | | |

Fig. 11

| Item | Description | Characteristics | Potential Failures | Action |
|---|---|---|---|---|
| 8.0 | Mission Critical Resilient Electrical Loads | | | |
| 8.1 | Identify the minimum electrical load necessary to maintain facility operations | | | |
| 8.2 | Identify the disconnecting means at each electrical load | | | |
| 8.3 | Identify fault protection associated with each disconnecting means for each electrical load | | | |
| 9.0 | Non-Mission Critical Electrical Loads | | | |
| 9.1 | Identify the balance of electrical loads within the HSM boundary | | | |
| 9.2 | Identify the disconnecting means at each electrical load | | | |
| 9.3 | Identify fault protection associated with each disconnecting means for the electrical load | | | |

Fig. 12

SECURE MICROGRID

This application claims the benefit of provisional application No. 61/489,128 filed on May 23, 2011 and entitled "Secure Microgrid."

A microgrid described herein may, for example, comprise a utility interconnect connecting the microgrid to an electric utility power distribution system; an underground power distribution system wherein the underground power distribution system is configured to have a feature selected from redundant power distribution capabilities and being wired as a loop distribution system with sectionalizing switches; a first set of loads comprising all nonresilient mission critical loads in the microgrid; a second set of loads comprising all resilient mission critical loads in the microgrid not contained in the first set of loads; a combined mission critical load comprising the first set of loads and the second set of loads; a first power generation source; a second power generation source wherein the second power generation source is a renewable energy power generation source; a quantity of fuel supplies sufficient to sustain the combined mission critical load for six months without connection to the electric utility power distribution system; an energy storage device; a third set of loads; and a fourth set of loads; wherein a total on-site power generation capability comprising the first power generation source and the second power generation source is sufficient to supply both the combined mission critical load and the third set of loads; wherein the total on-site power generation capability meets N+1 criteria for the combined mission critical load; wherein the utility interconnect comprises a first advanced metering infrastructure; wherein the first set of loads is connected to the underground power distribution system; wherein the first set of loads comprises a second advanced metering infrastructure; wherein the first set of loads comprises an uninterruptible power supply; wherein the second set of loads is connected to the underground power distribution system; wherein the second set of loads comprises a third advanced metering infrastructure. In a related embodiment, the first power generation source is connected to the underground power distribution system and the first power generation source comprises a fourth advanced metering infrastructure. In a related embodiment, the second power generation source is connected to the underground power distribution system and the second power generation source comprises a fifth advanced metering infrastructure. In a further related embodiment, the utility interconnect comprises an E2 pulse protection device and all microgrid components susceptible to an E1 pulses comprise an E1 pulse protection device. In a further related embodiment the microgrid further comprises a microgrid controller; wherein the third set of loads is connected to the underground power distribution system; wherein the third set of loads comprises a sixth advanced metering infrastructure; wherein the fourth set of loads is connected to the underground power distribution system; wherein the fourth set of loads comprises a seventh advanced metering infrastructure; and wherein the microgrid controller is arranged and configured for load shedding operations in which the fourth set of loads is disconnected prior to disconnecting the third set of loads and in which the third set of loads is disconnected prior to disconnecting the combined mission critical load. In a further related embodiment, the microgrid is arranged and configured for operation independent of the electric utility power distribution system. In a further related embodiment, the microgrid comprises a microgrid controller and a microgrid communication system wherein the microgrid controller and the microgrid communication system are compliant with NERC/CIP 002-4 and NERC/CIP 005-4 when each microgrid component necessary to supply power to the combined mission critical load is considered a critical asset under NERC/CIP 002-4 and an electronic security perimeter is established under NERC/CIP 005-4. In a further related embodiment, the microgrid comprises a building management system. In a further related embodiment, the microgrid comprises a weather monitoring device. In a further related embodiment the microgrid is arranged and configured to select between a power source from the electric utility power distribution system, the first power generation source, and the second power generation source to minimize energy cost. In a further related embodiment, the microgrid is arranged and configured for demand response market participation. In a further related embodiment, the microgrid is arranged and configured for dynamic load control relative to time of use and demand levels. In a further related embodiment, the microgrid is arranged and configured for load shaving.

Methods of protecting a microgrid described herein may for example, comprise identifying a first set of loads comprising all nonresilient mission critical loads in the microgrid; identifying a second set of loads comprising all resilient mission critical loads in the microgrid not contained in the first set of loads; identifying a combined mission critical load comprising the first set of loads and the second set of loads; identifying a utility interconnect connecting the microgrid to an electric utility power distribution system; identifying a set of potential failures with the possibility of disrupting power to the first set of loads wherein the set of potential failures comprises individual potential failures; evaluating the individual potential failures to assess the severity of the individual potential failures; evaluating the individual potential failures to assess the likelihood of occurrence of the individual potential failures; evaluating the individual potential failures to assess the likelihood of detection of the individual potential failures; ranking the individual potential failures to identify a first priority potential failure mode, a second priority potential failure mode, and a third priority potential failure mode; modifying the microgrid such that a risk posed by the first priority potential failure mode is mitigated and such that the microgrid further comprises: an underground power distribution system wherein the underground power distribution system is configured to have a feature selected from redundant power distribution capabilities and being wired as a loop distribution system with sectionalizing switches; a first power generation source; a second power generation source wherein the second power generation source is a renewable energy power generation source; a quantity of fuel supplies sufficient to sustain the combined mission critical load for six months without connection to the electric utility power distribution system; an energy storage device; a third set of loads; and a fourth set of loads. In a related method, after modifying the microgrid a total on-site power generation capability comprising the first power generation source and the second power generation source is sufficient to supply both the combined mission critical load and the third set of loads and the total on-site power generation capability meets N+1 criteria for the combined mission critical load. In a related method, after modifying the microgrid, the utility interconnect comprises a first advanced metering infrastructure. In a related method, after modifying the microgrid the first set of loads is connected to the underground power distribution system. In a related method, after modifying the microgrid the first set of loads comprises a second advanced metering infrastructure. In a related method, after modifying the microgrid the first set of loads comprises an uninterruptible power supply. In a related method, after modifying the microgrid the second set of loads is connected to the underground power distribution system. In a related method, after modifying the microgrid the second set of loads comprises a third advanced metering infrastructure.

BRIEF DESCRIPTION OF THE DRAWINGS

FIGS. 2-5 show a partial example of Failure Modes and Effects Analysis on a microgrid.

FIGS. 6-8 show ratings guides for the Failure Modes and Effects Analysis.

FIGS. 9-10 show a site characterization worksheet.

DETAILED DESCRIPTION

Example 1

Figure 1:
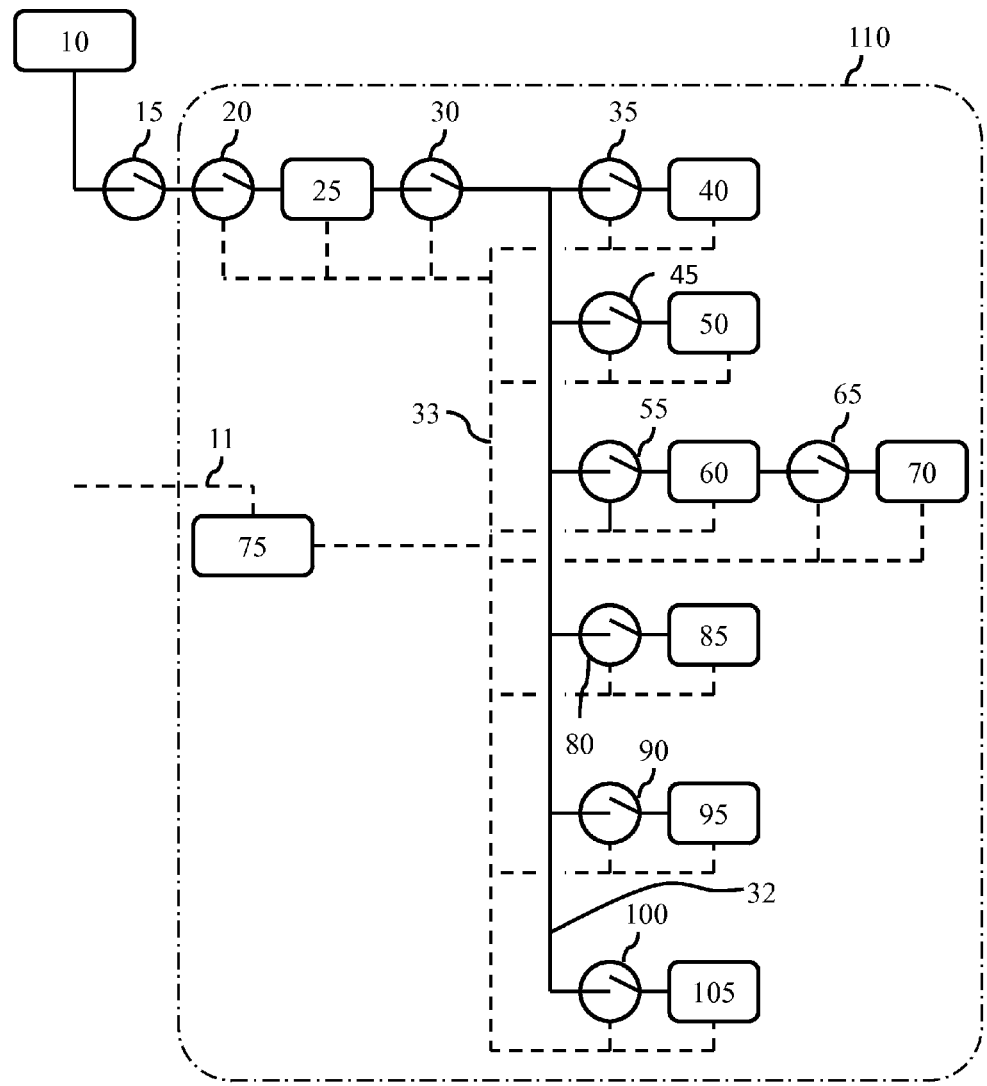
FIG. 1 shows an example a secure microgrid.

Referring now to FIG. 1 of the drawings; a microgrid may comprise an AMI which includes smart metering, automated switching devices, with secure communication capabilities; one or more customer substations as needed by the size and arrangement of the existing facility; power distribution system; communications; control and security equipment and software that is needed to provide a secure smart microgrid; distributed electric generation that may include solar photovoltaic (PV), wind, hydro, biomass, small modular nuclear reactors, natural gas fired, fuel oil fired, coal fired, fuel cell, or hybrid vehicles that will operate as localized on-site energy production; energy storage using batteries, hydrogen conversion, pumped storage (hydro power), capacitor banks, or flywheels, and an uninterruptible power supply (UPS) and battery used to provide uninterruptable power for the nonresilient mission critical electrical loads. As used herein the phrase "advanced metering infrastructure" (AMI) designates a collection of elements having some form of electromagnetic pulse (EMP) protection including a smart metering device and an automated switching device that is configured for secure two-way communications with a controller. As used herein, the term "mission critical" encompasses all equipment needed to support the essential activities of the relevant facility during an emergency or catastrophic event. Mission critical equipment may be classified either as "resilient," indicating a temporary loss of power does not risk disrupting the essential activities, or "nonresilient," indicating a temporary loss of power risks disrupting the essential activities.

The identification of the mission critical resilient electrical loads, mission critical nonresilient electrical loads, and non-mission critical electrical loads is important to the configuration of the microgrid. As that term is used herein, "utility interconnect" designates the point at which of the power distribution system changes from electric utility ownership to customer/microgrid owner ownership. The utility interconnect may, for example, be a substation or a switch yard and may contain an advanced metering infrastructure as part of the utility interconnect. In FIG. 1, Utility interconnect 10, which may be multiple interconnects at various voltage levels, is connected to First AMI 15. First AMI 15, which is owned by the local utility company, is electrically connected through the power distribution system to Second AMI 20 which is the first AMI of microgrid 110. Second AMI 20 and all other AMIs that are part of microgrid 110 are controlled by and in communication with Secure microgrid control system 75. Second AMI 20 is electrically connected through the power distribution system to Customer substations 25 which is in turn electrically connected to Third AMI 30. Third AMI 30 is electrically connected to several additional AMIs including Fourth AMI 35, Fifth AMI 45, Sixth AMI 55, Eighth AMI 80, Ninth AMI 90, and Tenth AMI 100 by way of Main line 32, which is the primary power distribution for microgrid 110. Fourth AMI 35 connects First distributed generator 40 to Main line 32. First distributed generator 40 may, for example, be comprised of solar PV cells, wind power generators, hydroelectric generators, biomass generators, a small modular nuclear reactor, natural gas fired generators, fuel oil fired generators, coal fired generators, fuel cells, or hybrid electric powered vehicles. First energy storage device 50 is connected to Main line 32 by Fifth AMI 45 and may take the form of large storage batteries, hydrogen storage, pumped storage, capacitor banks, or flywheels. Mission critical non-resilient electrical loads 70, that require 100% uptime, are separated from Main line 32 by sixth AMI 55 Uninterruptible power source and battery 60 and Seventh AMI 65. Eighth AMI 80 connects Mission critical resilient electrical loads 85 to Main line 32. Ninth AMI 90 and Tenth AMI 100 connect non-mission critical electrical loads 95 and Non-mission critical electrical loads 105 to Main line 32 respectively. Non-mission critical loads 95 are differentiated from non-mission critical loads 100 in that they are supported by on-site distributed generation in excess of that required for the mission critical loads. Communication Network 33 is the secure communication network that interconnects all of the elements of the microgrid and incorporates the requirements for cyber security. External communications 11 that tie to devices on the secure communication network 33 are documented and comply with the cyber security requirements.

Example 2

In protecting the mission critical electrical loads of the related embodiments, the microgrid complies with one or more of the following cyber security standards: ISO 27002, CIP-002-1 through CIP-009-2, NIST 800-12, NIST 800-14, NIST 800-37, NIST 800-53 rev 3, and ISA-99.01.01. In separate related embodiments, the microgrid complies with each of those individual cyber security standards. In a related embodiment, one or more of the above cyber security standards is supplemented to include the protection from EMPs provided by a nested faraday-type cage protection. This protection can be provided in accordance with the requirements defined in MIL-STD-188-125-1, High-Altitude Electromagnetic Pulse (HEMP) Protection for Ground-Based $C^4I$ Facilities Performing Critical, Time-Urgent Missions, part 1 Fixed Facilities.

In a wide array of embodiments consistent with this disclosure, known systems compliant with one or more of the above referenced cyber security standards may be modified by such shielding to enhance the security features of the microgrid thus enhancing the reliability of the microgrid.

EMP is as burst of electromagnetic energy such as those produced by solar eruptions or high or low altitude nuclear detonations. The resulting EMP is characterized as having three components described as the E1, E2, and E3 pulses. Solar eruptions only produce the E3 component. The E1 pulse is very fast and requires special filtering and/or shielding for protection. The E2 pulse is similar to those pulses produced by lightning and the E3 pulse tends to produce geomagnetically induced currents (GIC) in long transmission lines which can damage or destroy transformers. Protection against the E1 pulse for the critical loads defined at each location may include items such as HEMP/EMP filters installed at the computer systems for monitoring the microgrid components, AMI for the critical load or loads, and supervisory control and data acquisition (SCADA) systems for the microgrid and electrical equipment within the critical load being protected from an EMP event. Protection for the E2 pulse generally is provided by Lightning Protection installed on the power distribution system and protection for the E3 pulse, if required, is provided by the addition of GIC filters in the primary transformer neutral winding.

In a related embodiment, volume shielding is also used to protect the equipment against EMP depending on the complexity and amount of vulnerable equipment that is critical to the continued operations. Volume shielding is accomplished by protecting the area where the equipment is located using an impervious metal or alloy such as an aluminum envelop that will not allow EMPs to enter the space. Localized shielding can also be accomplished by using individualized shielding for each vulnerable piece of equipment required for system performance. The material may be a porous or open weave metal fabric with an insulating material between the metal fabric and the device that is being protected. The shielding must not be penetrated by any electrical wiring that is connected to a vulnerable device unless the wiring includes a Point of Entry (POE) protective device in accordance with MIL-STD-188-125-1. As used herein, "EMP protected" equipment designates equipment that is either inherently is protected from each of E1, E2, and E3 pulses or that is designed to be protected from each of E1, E2, and E3 pulses through one or more forms of protection including Faraday cages, EMP filters, surge protection, and grounding.

Example 3

In a series of related embodiments, the microgrid has one or more of the following features:

TABLE 1

| Advanced Metering Feature Number | Feature Description |
| --- | --- |
| 1 | Advanced Metering Infrastructure (AMI) at utility interface |
| 2 | Redundant AMI at utility interface |
| 3 | AMI at customer substations locations |
| 4 | AMI at all mission critical nonresilient load locations |
| 5 | AMI at all mission-critical resilient load locations |
| 6 | AMI at all distributed generation production sites |
| 7 | AMI at all energy storage sites |
| 8 | AMI at 30% of non-critical electrical load locations |
| 9 | AMI at 50% of non-critical electrical load locations |
| 10 | AMI at 100% of non-critical electrical load locations |

In certain embodiments containing the features of this example, AMI device placement is arranged so as to comply with one or more of NIST, NERC/CIP guidelines. In a related embodiment, AMI device placement is arranged so as to comply with each of NIST and NERC/CIP guidelines. Placement of AMI will allow the monitoring of power flows and faults and the control of power distribution during load shedding and power management conditions.

In general the AMI's will be a combination of devices that include the automatic switching and metering functions. This can include high and medium voltage breakers/switches with solid-state relaying, electrically operated low voltage breakers/switches and metering. The smart meters will be similar to the Power Logic ION 8600 energy and power quality meter produced by Schneider Electric, 295 Tech Park Suite 100, LaVergne, Tenn. 37086.

Example 4

In a series of related embodiments, the microgrid has one or more of the following load management features designed to protect the individual buildings and locations that make up the facility served by the microgrid:

TABLE 2

| Load Management Feature Number | Feature Description |
| --- | --- |
| 1 | Load management capability provided at 10% of the locations |
| 2 | Load management capability provided at 20% of the locations |
| 3 | Load management capability provided at 30% of the locations |
| 4 | Load management capability provided at 40% of the locations |
| 5 | Load management capability provided at 50% of the locations |
| 6 | Load management capability provided at 60% of the locations |
| 7 | Load management capability provided at 70% of the locations |
| 8 | Load management capability provided at 80% of the locations |
| 9 | Load management capability provided at 90% of the locations |
| 10 | Load management capability provided at 100% of the locations |

Load Management at the facilities may be provided by devices similar to the Johnson Controls FX Series Supervisory Controllers for building systems automation and control available from Johnson Controls, P.O. Box 423, Milwaukee, Wis. 53201.

Example 5

In a series of related embodiments, the microgrid has one or more of the following features:

TABLE 3

| Load Shedding Feature Number | Feature Description |
| --- | --- |
| 1 | Load shedding capability provided at 10% of the locations |
| 2 | Load shedding capability provided at 20% of the locations |
| 3 | Load shedding capability provided at 30% of the locations |
| 4 | Load shedding capability provided at 40% of the locations |
| 5 | Load shedding capability provided at 50% of the locations |
| 6 | Load shedding capability provided at 60% of the locations |
| 7 | Load shedding capability provided at 70% of the locations |
| 8 | Load shedding capability provided at 80% of the locations |
| 9 | Load shedding capability provided at 90% of the locations |
| 10 | Load shedding capability provided at 100% of the locations |

Load shedding capabilities may be provided to selectively load shed various facilities and/or electrical loads within those facilities based on a predetermined sequence. This capability may be provided by the AMI device at the facility coupled with a system level controller similar to the Microgrid System Controller made by PI Encorp of 1825 Sharp Point, Fort Collins, Colo. 80525, interfacing with the individual facility AMI switching devices.

Example 6

In a series of related embodiments, the microgrid has one or more of the following features:

TABLE 4

| Islanding Mode Capability Feature Number | Feature Description |
|---|---|
| 1 | Automatic isolation at Utility interconnect |
| 2 | Automatic detection of system restoration |
| 3 | Automatic Generation Controls (AGC) to support voltage and frequency control within the secure microgrid. |

Grid connection monitoring and control capabilities are provided to automatically isolate the microgrid on a loss of the utility and automatically reclose on restoration. This controller is designed to operate in both the grid connected and island modes with full voltage, frequency, and load control.

Example 7

In a series of related embodiments, the microgrid has one or more of the following features:

TABLE 5

| Power Distribution System Feature Number | Feature Description |
|---|---|
| 1 | Automated Circuit Breakers at all secure microgrid elements |
| 2 | Underground Power Distribution |
| 3 | Redundant or sectionalized Power Distribution |
| 4 | Secure microgrid Substation |
| 5 | Solar EMP Protection |
| 6 | Nuclear EMP Protection |

Nuclear EMP protection can be provided by compliance with the requirements of MIL-STD-188-125-1 and one example of a device that would provide Solar EMP protection is the Neutral DC Blocking system being manufactured in 2012 by EMPRIMUS, 1660 S Hwy 100, Suite 130, Minneapolis, Minn. 55413.

Example 8

In a series of related embodiments, the microgrid has one or more of the following features:

TABLE 6

| Energy Storage/Fuel Supply Feature Number | Feature Description |
|---|---|
| 1 | Provision for adding backup capacity |
| 2 | Power Backup and UPS capacity (4 hours) |

TABLE 6-continued

| Energy Storage/Fuel Supply Feature Number | Feature Description |
|---|---|
| 3 | Power Backup and UPS capacity (12 hours) |
| 4 | Power Backup and UPS capacity (24 hours) |
| 5 | Power Backup and UPS capacity (1 week) |
| 6 | Power Backup and UPS capacity (1 month) |
| 7 | Power Backup and UPS capacity (3 months) |
| 8 | Power Backup and UPS capacity (6 months) |
| 9 | Power Backup and UPS capacity meets N + 1 criteria |
| 10 | Power Backup and UPS capacity meets N + 2 criteria |

For example, a Power Backup and UPS capability that meets N+1 criteria indicates that the Power Backup and UPS source(s) meets 100% of the power requirements for the mission critical non-resilient electrical loads and includes one additional source equal to the size of the largest source in operation.

Example 9

In a series of related embodiments, the microgrid has one or more of the following features:

TABLE 7

| Renewable Energy Production Feature Number | Feature Description |
|---|---|
| 1 | Provision for adding renewable components |
| 2 | Single Source of Renewable Energy |
| 3 | Multiple Source of Renewable Energy |
| 4 | Renewable energy production meets Mission Critical nonresilient Load Demand Criteria |
| 5 | Renewable energy production meets Mission Critical nonresilient and resilient Load Demand Criteria |
| 6 | Renewable energy production meets Mission Critical and 30% Non-mission critical Load Demand Criteria |
| 7 | Renewable energy production meets Mission Critical Load Demand and 60% Non-mission critical Load Demand Criteria |
| 8 | Renewable energy production meets Mission Critical Load Demand and 100% Non-mission Critical Load Demand Criteria |
| 9 | Renewable Energy production meets N + 1 criteria |
| 10 | Renewable Energy production meets N + 2 criteria |

Example 10

In a series of related embodiments, the microgrid has one or more of the following features:

TABLE 8

| Cyber security Capability Feature Number | Feature Description |
|---|---|
| 1 | Evaluation of cyber security provisions completed |
| 2 | Compliance with current NERC/CIP and NIST guidelines for the communications and control equipment |
| 3 | Compliance with current NERC/CIP and NIST guidelines for the communications and control equipment and the mission critical nonresilient electrical loads |
| 4 | Compliance with current NERC/CIP and NIST guidelines for the communications and control equipment, the mission critical nonresilient electrical loads and 50% of the mission critical resilient electrical loads |
| 5 | Compliance with current NERC/CIP and NIST guidelines for the communications and control equipment, the mission critical nonresilient electrical loads and 100% of the mission critical resilient electrical loads |
| 6 | Compliance with current NERC/CIP and NIST guidelines for the communications and control equipment, the mission critical electrical loads, 100% of the mission critical resilient electrical loads and 50% of the non-mission critical electrical loads |
| 7 | Compliance with current NERC/CIP and NIST guidelines for the communications and control equipment, the nonresilient mission critical electrical loads, the critical load electrical circuits, 100% of the mission critical resilient electrical loads and 100% of the non-mission critical electrical loads |
| 8 | Secure operational condition with EMP protection for the communications and control equipment |
| 9 | Secure operational condition with EMP protection for the communications and control equipment and the mission critical locations |
| 10 | Secure operational condition with EMP protection for the communications and control equipment, and all mission critical and non-mission critical locations |

For example, all elements within microgrid 110 that are connected to the secure communication network 33 are considered Critical Cyber Assets. Each of these elements will be considered to be within an electronic security perimeter and all external communications 11 will be identified and controlled to meet the NERC/CIP cyber security requirements.

Example 11

In a series of related embodiments, the microgrid has at one or more of the following features:

TABLE 9

| Integration of smart microgrid components Feature Number | Feature Description |
|---|---|
| 1 | Secure microgrid Controls (SCADA) |
| 2 | Secure microgrid Communications |
| 3 | Utility Interconnect |
| 4 | Customer Substation |
| 5 | Secure microgrid Power Distribution |
| 6 | Distributed Generation |
| 7 | Energy Storage |
| 8 | Nonresilient Mission Critical Loads |
| 9 | Resilient Mission Critical Electrical Loads |
| 10 | Non-mission Critical Electrical Loads |

In one embodiment the microgrid will contain all 10 elements identified in Table 9 and support 100% of the facility electrical loads. In an alternate embodiment, the microgrid will contain all elements, except element number 10 in Table 9 and will support 100% of the mission critical electrical loads.

Example 12

In a series of related embodiments, the microgrid has one or more of the following features:

TABLE 10

| Cost benefit (ROI) Feature Number | Feature Description |
|---|---|
| 1 | ROI </= 10 Years |
| 2 | ROI </= 9 Years |
| 3 | ROI </= 8 Years |
| 4 | ROI </= 7 Years |
| 5 | ROI </= 6 Years |
| 6 | ROI </= 5 Years |
| 7 | ROI </= 4 Years |
| 8 | ROI </= 3 Years |
| 9 | ROI </= 2 Years |
| 10 | ROI </= 1 Years |

Example 13

Those items designated with feature numbers and bearing feature descriptions in tables 1-10 are collectively referred to herein as "significant microgrid attributes" with individual significant microgrid attributes referred to by their feature description as found in Tables 1-10. Further, significant microgrid attributes may be referred to in groups by designations such as the use of "advanced metering features" to indicate advanced metering feature numbers 1-10 as found in Table 1.

In one embodiment, a microgrid has 30-39 significant microgrid attributes. In a related embodiment, a microgrid has 40-49 significant microgrid attributes. In a further related embodiment, a microgrid has 50-59 significant microgrid attributes. In a further related embodiment, a microgrid has 60-69 significant microgrid attributes. In a still further related embodiment, a microgrid has 70 or more significant microgrid attributes.

Example 14

Failure Modes and Effects Analysis (FMEA) applied to microgrid components improves existing analysis by clear identification of the components found in an existing electrical distribution system, describing potential failures, predicting the effect of the failure and rating the severity, occurrence and the ability of detection of the failure in a manner that prioritizes the potential failure. The result of this method is the identification of the microgrid elements that may be replaced or enhanced in a way that significantly upgrades the security of the microgrid.

In one example, a single interconnect would have a potential breaker trip failure causing loss of power. The severity, occurrence and detection are rated on a scale of 1-10 and are evaluated to be 7, 2 and 1 respectively. The FMEA risk priority number therefore is determined to be 14.

In a related example, an overhead (OH) radial distribution system may have a breaker trip resulting in power loss. The severity, occurrence and detection rating is accessed at 7, 4 and 3 resulting in a FMEA risk priority rating of 84. Therefore, the higher rating defines that it is more important to replace or improve the operation of the OH electrical system in order to enhance the performance, security, and reliability of the microgrid.

In an embodiment of the invention, an assessment is conducted of the various modes of system failure for a microgrid having features of one or more of the preceding examples and those modes of failure are characterized and rated by the severity of the failure, frequency of the failure, and the ability to detect the failure. FIGS. 2-5 when viewed as a whole represent an example of a partially filled table on which this type of analysis can be performed with FIGS. 6-8 used as a reference to numerically describe the failures on the worksheet of FIGS. 2-5.

Example 15

In one embodiment, a performance anomaly is identified in a microgrid system. As used herein the term performance anomaly designates that an electrical device has a predictive operational failure. A performance anomaly may for example take the form of an OH radial distribution system that exhibits a potential breaker trip. Relevant data is gathered. In the case of the above example, an OH radial distribution system is defined by the length, type of wire and loads that the OH radial distribution system is experiencing during current operation. Computer model simulations of the electrical distribution system are then run to assess the performance and/or failure rate of replacement devices and load balancing while operating under the planned operational conditions to determine an optimal or near optimal replacement solution/equipment. In an example of the above process, a manual switch may be replaced with a smart switch rated with a sufficient load rating such that the total expected failure rate of the radial OH distribution system is reduced.

Example 16

In another embodiment, a potential performance improvement is reviewed by simulating the performance of a recommended set of equipment and comparing the simulated performance metrics of the recommended equipment against simulated and/or actual metrics for existing equipment. Among the metrics considered are the capacity of a new solar PV system, sizing of backup batteries, and evaluation of critical load and cost of components. The reviewed performance improvement is then selected or rejected based upon the metrics. In a related embodiment, multiple potential performance improvements are evaluated and one of the several improvements is selected based upon the metrics.

Example 17

In one embodiment of the invention, the basic components of the microgrid include one or more AMIs. Analysis of the loads and load shedding capability and compliance with security requirements as described in ISO 27002, CIP-002-4 and CIP-009-4, NIST 800-12, NIST 800-14, NIST 800-37, NIST 800-53 rev 3, and ISA-99.01.01 is then conducted. The analysis of the load shedding is performed using electrical modeling simulation software such as the Electrical Transient Analysis Program (ETAP) by ETAP/Operation Technology, Inc. at 17 Goodyear, Suite 100, Irvine, Calif. 92618 and/or the modeling software available from Power Analytics, 16780 West Bernardo Drive, San Diego, Calif. 92127. These software programs provide the ability to build a model of the microgrid electrical distribution system and then perform simulations to obtain power flow analysis, fault analysis, coordinate protective relay settings, power quality analysis and mitigation, dynamic response analysis, design optimization, and equipment sizing. Real-time data can also be compared to the analytical model and used to predict performance anomalies and/or operational improvements.

Example 18

The methods described herein may for example comprise inventorying the site electrical distribution equipment, assessing the condition of equipment, evaluating the equipment using FMEA, evaluating the vulnerability of the current system, evaluating the load and load shedding options, identifying and predicting the output from onsite energy production, evaluating and recommending improvements to backup storage, simulating the performance of existing equipment and proposed equipment, reevaluating upgrade options, evaluating financial return on investment, and evaluating the upgraded system as quantified by the rating system shown in Tables 1-10.

Example 19

In a series of related embodiments, the methods described herein may for example comprise the design and/or construction of a microgrid having between 40 and 49 points, between 50 and 59 points, between 60 and 69 points, between 70 and 79 points, or greater than or equal to 80 points as determined using the scoring method associated with Tables 1-10.

As used herein the term "points" refers to the scoring of a microgrid according to the scoring system associated with Tables 1-10.

As used herein references to percentage of load demand refers to the average daily peak electric capacity demanded over the preceding 12 month period whether or not locations are referenced.

Example 20

In a variation of the evaluations associated with Tables 1-10 Table 11 is used in the place of Table 7 and Table 10 is not used as part of the analysis.

TABLE 11

| Distributed Generation Feature Number | Feature Description |
|---|---|
| 1 | Microgrid configured to allow distributed generation |
| 2 | Single Source of power generation |
| 3 | Multiple Sources of power generation |

TABLE 11-continued

| Distributed Generation Feature Number | Feature Description |
|---|---|
| 4 | On-site power generation capability meets nonresilient Mission Critical Load Demand Criteria |
| 5 | On-site power generation capability meets non-resilient and resilient Mission Critical Load Demand Criteria |
| 6 | On-site power generation capability meets Mission Critical and 30% of the Non-mission critical Load Demand Criteria |
| 7 | On-site power generation capability meets Mission Critical Load Demand and 60% of the Non-mission critical Load Demand Criteria |
| 8 | On-site power generation capability meets Mission Critical Load Demand and 100% of the Non-mission Critical Load Demand Criteria |
| 9 | On-site power generation capability meets N + 1 criteria |
| 10 | On-site power generation capability meets N + 2 criteria |

For example, a distributed generation production capability that meets N+1 criteria indicates that the total combination of distributed generation sources meets 100% of the power requirements and includes one additional power source equal to the size of the largest source in operation.

Example 21

Based on the alternate example described in Example 20, items designated with feature numbers and bearing feature descriptions in Tables 1-6, 8-9, and 11 are collectively referred to herein as "significant alternative microgrid attributes" with individual significant alternative microgrid attributes referred to by their feature description as found in Tables 1-6, 8-9, and 11.

In one embodiment, a microgrid has 22-31 significant alternate microgrid attributes. In a related embodiment, a microgrid has 32-41 significant alternate microgrid attributes. In a further related embodiment, a microgrid has 42-51 significant alternate microgrid attributes. In a further related embodiment, a microgrid has 52-61 significant microgrid attributes. In a still further related embodiment, a microgrid has 62 or more significant microgrid attributes.

Example 22

In another embodiment, the individual attributes of a microgrid described in FIGS. 9-12 are assessed. As part of the assessment, potential failures associated with the identified equipment are described and characterized. Actions are recommended and/or taken to improve the security of the microgrid and/or decrease the failure rate of the microgrid or of the components of the microgrid.

Example 23

In a prophetic example, a microgrid having the following features may be implemented at a military installation, government facility, or other facility having elevated security needs. In the present embodiment, the mission critical electrical loads of the facility are arranged to operate in island mode such that they are both electrically and digitally isolated from the power grid on a loss of off-site power. The microgrid is configured to automatically engage in an island mode operation and is arranged and configured to be able to sustain such operation for at least six months. As part of the automatic engagement of the island mode, load shedding is also automatically engaged such that mission critical electrical loads are supplied with power and non-mission critical electrical loads are isolated and shut down.

In the present example, there are multiple power generation sources within the confines of the facility. For example, in the case of a military installation the power generation sources would be within the perimeter fence. The microgrids associated with this example have at least one renewable energy power generating source selected from solar PV sources, wind power, geothermal power, and/or biomass fueled power generation. The microgrid of the present example is powered by both solar PV sources and by wind power. The microgrid also has a natural gas powered generating system connected into a gas processing and delivery system. The microgrid may also contain a continuously replenished liquid fuel generator system. The microgrid further contains an uninterruptible power supply battery system such as the UPS model number series 3DPP060 produced by Ametek Solid-State Controls, 875 Dearborn Dr., Columbus, Ohio 43085. In the present example, the microgrid is arranged such that each power generation source independently produces enough power to supply the mission critical electrical loads. In a related example three or more power generation sources are present and each of the three power generation sources produces enough power to supply at least 50% of the mission critical electrical loads. In the present example, the renewable power generation sources account for greater than 25% of the mission critical load. The natural gas powered generating plant has its own on-site supply of natural gas. Further, the system is configured such that a UPS protects each nonresilient mission critical electrical load.

In the present example, energy source diversity is accomplished through separate independent substation/power supply paths from the grid and/or local utility providers and/or other local renewable energy sources. The substation/power supply paths are independent from one another and independent from internal power sources and arranged and configured to automatically switch between power sources in a way that maintains adequate power supply to the mission critical electrical loads and such that faults and other system problems may be isolated. This configuration is accomplished through a redundant power distribution network, but may also be accomplished through a power distribution loop arranged with sectionalizing switches.

Fuel sources are arranged and coordinated at the facility in quantities sufficient to maintain at least six months of continuous operation at the designated mission critical electrical loads.

The microgrid is arranged and configured to be self-healing with respect to errors and faults in the power delivery system. The microgrid is further arranged and configured to detect system component degradation and performance anomalies, provide warning about those anomalies and automatically bypass effected equipment when the equipment impacts the reliability of the power supply. The present microgrid, also automatically returns to normal operation after the fault has been cleared. The microgrid also dynamically compares real-time data to an electrical model during normal operation and optimizes the utilization of power resources based on the real-time data.

In the present example, the microgrid backup power operations are responsive to local severe weather information with certain backup power operations being initiated in response to either indications of severe weather or actual measured weather conditions.

The microgrid is configured to meet or exceed DoD requirements for Networthiness—interoperability, supportability, sustainability and usability, including bandwidth usage rates. The microgrid further meets North American Electrical Reliability Corporation Critical Infrastructure Protection (NERC/CIP) requirements and meets all requirements for Department of Defense Information Assurance Certification and Accreditation The microgrid is further configured to have resistance to natural phenomenon and disasters including protection from high-speed wind and ice by underground bus ducts for power distribution and wiring. In addition the microgrid is protected from flooding with all wiring and power distribution equipment, which are located in potential flood zones, to be designed and suitable for the application.

The microgrid is configured to have resistance against EMP by the use of shielding and a variety of filtering equipment with the EMP protection being sufficient to shield all electrical components from any substantial damage that would be caused by solar EMP or EMP associated with nuclear weapons. For example, HEMP/EMP filter part number A-9597 available from Captor Corporation, 5040 South County Road 25A, Tipp City, Ohio, 45371, or other similar EMP filters may be used. Another example of suitable EMP protection is the Neutral DC Blocking System produced by EMPrimus, located at 1660 S. Hwy 100, Suite 130, Minneapolis, Minn. 55413. EMP protection for the microgrid is configured to comply with MIL-STD-188-125-1. Further, all equipment, including transformers, switchgear, and power controls, having potential exposure to physical attack such as explosive devices is situated in concrete enclosures.

The microgrid is configured to efficiently utilize power from the multiple power supplies when operating in non-emergency mode. The microgrid is configured to have two-way communication with electrical loads such that load management can be conducted accounting for power supply costs. The microgrid is further configured to have two-way communication with all power supply sources and to account for the power generation costs associated with each of those sources so that the cost of power being supplied is both monitored and managed The microgrid contains a supervisory control and data acquisition system that logs and reports power utilization from the various power sources for potential use in the negotiation of contracts for external power supply, for external power supply billing reconciliations and for facilitating participation in electric demand response commercial programs.

The microgrid is configured for automated reserve power supply dispatch such that power can be strategically sold back to the grid through demand response sales.

Additionally, the microgrid is configured for failure logging, and trending and analysis for directing predictive maintenance. Each of the facilities within the microgrid are configured with a Building Management Systems (BMS) that is interconnected with the microgrid control system for energy utilization monitoring and optimization.

The microgrid is further configured for dynamic load control relative to time of use and demand levels and is configured to have load shaving capabilities.

In the present example, the microgrid is configured with the capability to minimize environmental impact during normal nonemergency operation. The configuration allows for continuous selection of a mix of power supply sources that minimize total emissions. The microgrid is further configured to calculate emissions and emission reductions associated with selection of the mix of power supply sources being utilized. The microgrid has characteristics associated with the ISO 14001 standard for the management of the environmental impacts of the system.

In one embodiment, the microgrid control system is configured with a distributed architecture such that there are independent controllers for each of the power sources, energy storage devices, remote loads, and the overall system level operations. These controllers will communicate with a redundant communication system that includes elements of cyber security.

Example 24

Embodiments and methods described herein may be used together with a characterization and evaluation of a site according to the present example. The site is characterized by first determining the microgrid boundary, then collecting historical utility billing data, billing structure, and data relating to utility outages. The scope of the existing site electrical distribution system along with the ratings of individual pieces of equipment are identified and characterized and each of the existing BMS is characterized. In the case that a utility interconnect agreement already exist for any on-site distributed generation that could be paralleled with the utility, renegotiation of that agreement is initiated or negotiations for a new agreement are initiated if no previous agreement existed and the new distributed generation could be paralleled with the utility. The characteristics of the customer substation are evaluated and existing and potential opportunities for both distributed generation and energy storage are considered and characterized. Electrical loads are characterized as resilient mission critical electrical loads, non-resilient mission critical electrical loads, and non-mission critical electrical loads. Based on those characterizations an Energy Master Plan and design criteria are developed. The master plan and design criteria account for those nonresilient mission critical electrical loads that should be matched with UPS or battery storage. A site ranking is developed prior to implementation of the master plan based according to the ranking criteria of Example 21. A determination of the desired ranking is made followed by a determination of which elements are necessary to reach that desired ranking. Then a microgrid design basis is prepared and a FMEA evaluation is conducted to optimize the specific site design. Once implemented the improvement in the ranking criteria according to Example 21 is calculated.

The most recent version of MIL-188-125-1 relating to EMP protection as of May 23, 2012 is hereby incorporated by reference.

We claim:
1. A microgrid comprising:
(a) a utility interconnect connecting the microgrid to an electric utility power distribution system;
(b) an underground power distribution system wherein the underground power distribution system is configured to have a feature selected from redundant power distribution capabilities and being wired as a loop distribution system with sectionalizing switches;
(c) a microgrid controller;
(d) a first set of loads comprising all nonresiliant mission critical loads in the microgrid;
(e) a second set of loads comprising all resilient mission critical loads in the microgrid not contained in the first set of loads;
(f) a combined mission critical load comprising the first set of loads and the second set of loads;
(g) a first power generation source;

(h) a second power generation source wherein the second power generation source is a renewable energy power generation source;
(i) a quantity of fuel supplies sufficient to sustain the combined mission critical load for at least six months without connection to the electric utility power distribution system;
(j) an energy storage device;
(k) a third set of loads;
(l) a fourth set of loads;
(m) wherein a total on-site power generation comprising the first power generation source and the second power generation source is sufficient to supply both the combined mission critical load and the third set of loads;
(n) wherein the total on-site power generation capability meets N+1 criteria for the combined mission critical load;
(o) wherein the utility interconnect comprises a first advanced metering infrastructure;
(p) wherein the first set of loads is connected to the underground power distribution system;
(q) wherein the first set of loads comprises a second advanced metering infrastructure;
(r) wherein the first set of loads comprises an uninterruptible power supply;
(s) wherein the second set of loads is connected to the underground power distribution system;
(t) wherein the second set of loads comprises a third advanced metering infrastructure;
(u) wherein the first power generation source comprises a fourth advanced metering infrastructure;
(v) wherein the second power generation source comprises a fifth advanced metering infrastructure;
(w) wherein the third set of loads comprises a sixth advanced metering infrastructure;
(x) wherein the fourth set of loads comprises a seventh advanced metering infrastructure; and
(y) wherein the advanced metering infrastructures are comprised of a collection of elements having some form of electromagnetic pulse protection including a smart metering devices and an automated switching device that are configured for secure two-way communications with the controller.

2. The microgrid of claim 1 wherein the first power generation source is connected to the underground power distribution system.

3. The microgrid of claim 1 wherein the second power generation source is connected to the underground power distribution system.

4. The microgrid of claim 1 wherein the utility interconnect comprises an E2 pulse protection device and all microgrid components susceptible to an E1 pulses comprise an E1 pulse protection device.

5. The microgrid of claim 1
(a) wherein the third set of loads is connected to the underground power distribution system;
(b) wherein the fourth set of loads is connected to the underground transmission system;
(c) wherein the microgrid controller is arranged and configured for loads shedding operations in which the fourth set of loads is disconnected prior to disconnecting the third set of loads and in which the third set of loads is disconnected prior to disconnecting the combined mission critical load.

6. The microgrid of claim 1 wherein the microgrid is arranged and configured for operation independent of the electric utility power distribution system.

7. The microgrid of claim 1 further comprising a microgrid controller and a microgrid communication system wherein the microgrid controller and the microgrid communication system are compliant with NERC/CIP 002-4 and NERC/CIP 005-4 where each microgrid component necessary to supply power to the combined mission critical load is considered a critical asset under NERC/CIP 002-4 and an electronic security perimeter is established under NERC/CIP 005-4.

8. The microgrid of claim 1
(a) further comprising a building management system;
(b) wherein the building management system is comprised of a dedicated control system capable of performing load shedding.

9. The microgrid of claim 1 wherein the microgrid is arranged and configured for dynamic selection between a power source from the electric utility power distribution system, and the first power generation source, and the second power generation source to minimize energy costs.

10. The microgrid of claim 1 wherein the microgrid is arranged and configured for demand response market participation.

11. The microgrid of claim 1 wherein the microgrid is arranged and configured for dynamic load control relative to the time of use and demand levels.

12. The microgrid of claim 1 wherein the microgrid is arranged and configured for shaving.

13. A method of protecting a microgrid comprising:
(a) identifying a first set of loads comprising all nonresilient mission critical loads in the microgrid;
(b) identifying a second set of loads comprising all resilient mission critical loads in the microgrid not contained in the first set of loads;
(c) identifying a combined mission critical load comprising the first set of loads and second set of loads;
(d) identifying a utility interconnect connecting the microgrid to an electric utility power distribution system;
(e) identifying a set of potential failures with the possibility of disrupting power to the first set of loads wherein the set of potential failures comprises individual potential failures;
(f) evaluating the individual potential failures to assess the severity of the individual potential failures;
(g) evaluating the individual potential failures to assess the likelihood of occurrence of the individual potential failures;
(h) evaluating the individual potential failures to assess the likelihood of detection of the individual potential failures;
(i) ranking the individual potential failures to identify a priority potential failure mode, a second priority potential failure mode, and a third priority potential failure mode;
(j) modifying the microgrid such that a risk posed by the first priority potential failure mode is mitigated and such that the microgrid further comprises:
  i. an underground power distribution system wherein the underground power distribution system is configured to have a feature selected from redundant power distribution capabilities and being wired as a loop distribution system with sectionalized switches;
  ii. a first power generation source;
  iii. a second power generation source wherein the second power generation source is a renewable energy power generation source;
  iv. a quantity of fuel supplies sufficient to sustain the combined mission critical load for at least six months without connection to the electric power distribution system;
  v. an energy storage device;
  vi. a third set of loads; and
  vii. a fourth set of loads.

14. The method of claim 13:
(a) wherein after modifying the microgrid a total on-site power generation capability comprising the first power generation source and the second power generation source is sufficient to supply both the combined mission critical load and the third set of loads; and
(b) wherein the total on-site power generation capability means N+1 redundancy protection criteria for the combined mission critical load.

15. The method of claim 13 wherein after modifying the microgrid, the utility interconnect comprises a first advanced metering infrastructure.

16. The method of claim 13 wherein after modifying the microgrid the first set of loads is connected to the underground power distribution system.

17. The method of claim 13 wherein after modifying the microgrid the first set of loads comprises a second advanced metering system.

18. The method of claim 13 wherein after modifying the microgrid the first set of loads comprises an uninterruptible power supply.

19. The method of claim 13 wherein after modifying the microgrid, the second set of loads is connected to the underground power distribution system.

20. The method of claim 13 wherein after modifying the microgrid, the second set of loads comprising a third advanced metering infrastructure.

* * * * *